US007214050B2

(12) United States Patent
Wang

(10) Patent No.: US 7,214,050 B2
(45) Date of Patent: May 8, 2007

(54) ADJUSTING STRUCTURE OF AN ADJUSTING SEAT OF AN INJECTION MOLDING MACHINE

(75) Inventor: Jui-Hsiang Wang, Yung Kang (TW)

(73) Assignee: Hwa Chin Machinery Factory Co., Ltd., Tainan Hsien (TW)

( * ) Notice: Subject to any disclaimer, the term of this patent is extended or adjusted under 35 U.S.C. 154(b) by 64 days.

(21) Appl. No.: 11/237,925

(22) Filed: Sep. 29, 2005

(65) Prior Publication Data
US 2007/0071847 A1    Mar. 29, 2007

(51) Int. Cl.
*B29C 45/66* (2006.01)
(52) U.S. Cl. ...................................... 425/190; 425/593
(58) Field of Classification Search ................. 425/190, 425/589, 593, 595
See application file for complete search history.

(56) References Cited

U.S. PATENT DOCUMENTS 3,534,442 A * 10/1970 Mahle ........................ 425/593
3,756,757 A * 9/1973 Grundmann ................. 425/593
4,105,390 A * 8/1978 Hehl ......................... 425/450.1
4,256,166 A * 3/1981 Prince ....................... 164/154.8
5,378,141 A * 1/1995 Aoki ........................... 425/595
5,585,126 A * 12/1996 Heindl et al. ............... 425/593
6,050,804 A * 4/2000 Tamaki et al. ............... 425/190
6,478,571 B1 * 11/2002 Tsai et al. .................... 425/593
6,527,536 B2 * 3/2003 Okubo et al. ................ 425/190
6,796,783 B1 * 9/2004 Weinmann et al. .......... 425/190

* cited by examiner

*Primary Examiner*—James P. Mackey
(74) *Attorney, Agent, or Firm*—Rosenberg, Klein & Lee

(57) ABSTRACT

An adjusting seat of an injection molding machine has a split-flow hydraulic pump secured thereon; the split-flow hydraulic pump is equipped with several oil input/output conduit sets; several hydraulic motors are secured on the adjusting seat and connected to respective ones of the oil input/output conduit sets of the split-flow hydraulic pump; each of the hydraulic motors has a toothed disk on an output portion thereof; the injection molding machine further has several gears, which are positioned around tie rods of the molding machine, and engage the toothed disks respectively; each of the toothed disks has a sub gear joined thereto while a chain is positioned over and engaged with the sub gears.

2 Claims, 5 Drawing Sheets

ADJUSTING STRUCTURE OF AN ADJUSTING SEAT OF AN INJECTION MOLDING MACHINE

BACKGROUND OF THE INVENTION

1. Field of the Invention

The present invention relates to an adjusting structure of an adjusting seat of an injection molding machine, more particularly one, which includes a split-flow hydraulic pump, four hydraulic motors connected to conduits of the split-flow hydraulic pump, four toothed disks on the output portions of the hydraulic motors, and four gears respectively positioned around tie rods and engaging the toothed disks such that position of the adjusting seat can be smoothly adjusted, and the risk of damage reduced.

2. Brief Description of the Prior Art

Referring to FIG. 1, a currently existing injection molding machine 1 includes a first mold support 11, an adjusting seat 12, a second mold support 13, a moving wall 14, four tie rods 15, a toggle arm mechanism 16, and a hydraulic cylinder 17. The first mold support 11 is used for supporting a male part of a mold. The second mold support 13 is arranged between the first mold support 11 and the adjusting seat 12 for supporting a female part of a mold while the moving wall 14 is arranged between the second mold support 13 and the adjusting seat 12. The tie rods 15 are passed through the first mold support 11, the adjusting seat 12, the second mold support 13, and the moving wall 14. The hydraulic cylinder 17 is used to move the moving wall 14 on the tie rods 15 while the toggle arm mechanism 16 is positioned between the second mold support 13 and the adjusting seat 12, and movable together with the moving wall 14; thus, when the hydraulic cylinder 17 is actuated to move the moving wall 14, the toggle arm mechanism 16 will move so as to make the second mold support 13 change its position in relation to the first mold support 11 for mold closing or opening.

Because different molds have different thicknesses, when a new two-part mold is used on the molding machine instead of the original one, the adjusting seat 2 usually has to be adjusted in position such that the two-part mold can be properly closed by means of the hydraulic cylinder 17 and the toggle arm mechanism 16.

Referring to FIG. 2, the adjusting seat 2 has a motor 18, a toothed disk 19, and four gears 10 thereon; the motor 18 is used for causing rotational motion of the toothed disk 19 while the gears 10 are positioned around respective ones of the tie rods 15, and engaged with the toothed disk 19. Therefore, when the motor 18 is activated, rotational motion of the motor 18 will be transmitted to the gears 10 through the toothed disk 19, and in turn the gears 10 will move linearly on the tie rods 15, thus causing linear displacement of the adjusting seat 12 on the tie rods 15.

However, the above adjusting structure of the adjusting seat has the following disadvantages:

1. The motor has to provide power to the toothed disk alone therefore the motor has to be capable of producing great force. Consequently, consumption of electricity and the cost increases.

2. All power will be concentrated on the currently engaged teeth of the motor and the toothed disk therefore the teeth of the motor and the toothed disk are prone to get damaged, and power won't be effectively transmitted any more.

3. The toothed disk has to precisely engage all of the four gears otherwise power transmission won't be smooth. Therefore, the toothed disk and the gears have to be precision-manufactured, causing increase to the cost as well as time used in the assembly and calibration.

Germany Patent No. DE 4329070 discloses an adjusting structure of an adjusting seat of a molding machine, which includes a belt used to transmit power from single motor to several gears positioned on respective tie rods. Because the motor has to provide power alone, the output thereof has to be relatively large. Consequently, service life of the motor will shorten. In addition, the power transmission can't be very effective because the gears don't have equal force exerted thereon with the belt used as the transmission means.

SUMMARY OF THE INVENTION

It is a main object of the invention to provide an improvement on an adjusting seat of an injection molding machine to overcome the above-mentioned problems. The adjusting seat of the present invention has a split-flow hydraulic pump secured thereon, which is equipped with four oil input/output conduit sets. The adjusting seat has four hydraulic motors secured thereon, which are connected to respective ones of the oil input/output conduit sets. Each of the hydraulic motors has a toothed disk on an output portion thereof. The injection molding machine further has four gears, which are positioned around tie rods of the molding machine, and engage the toothed disks respectively. Each of the toothed disks has a sub gear joined thereto while a chain is positioned over and engaged with the sub gears.

Therefore, hydraulic oil will be evenly distributed among the four hydraulic motors, and the four gears will have equal force exerted thereon; force output provided to displace the adjusting seat is shared among the four gears, thus significantly reducing the risk of damage of the gears and the associated parts.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
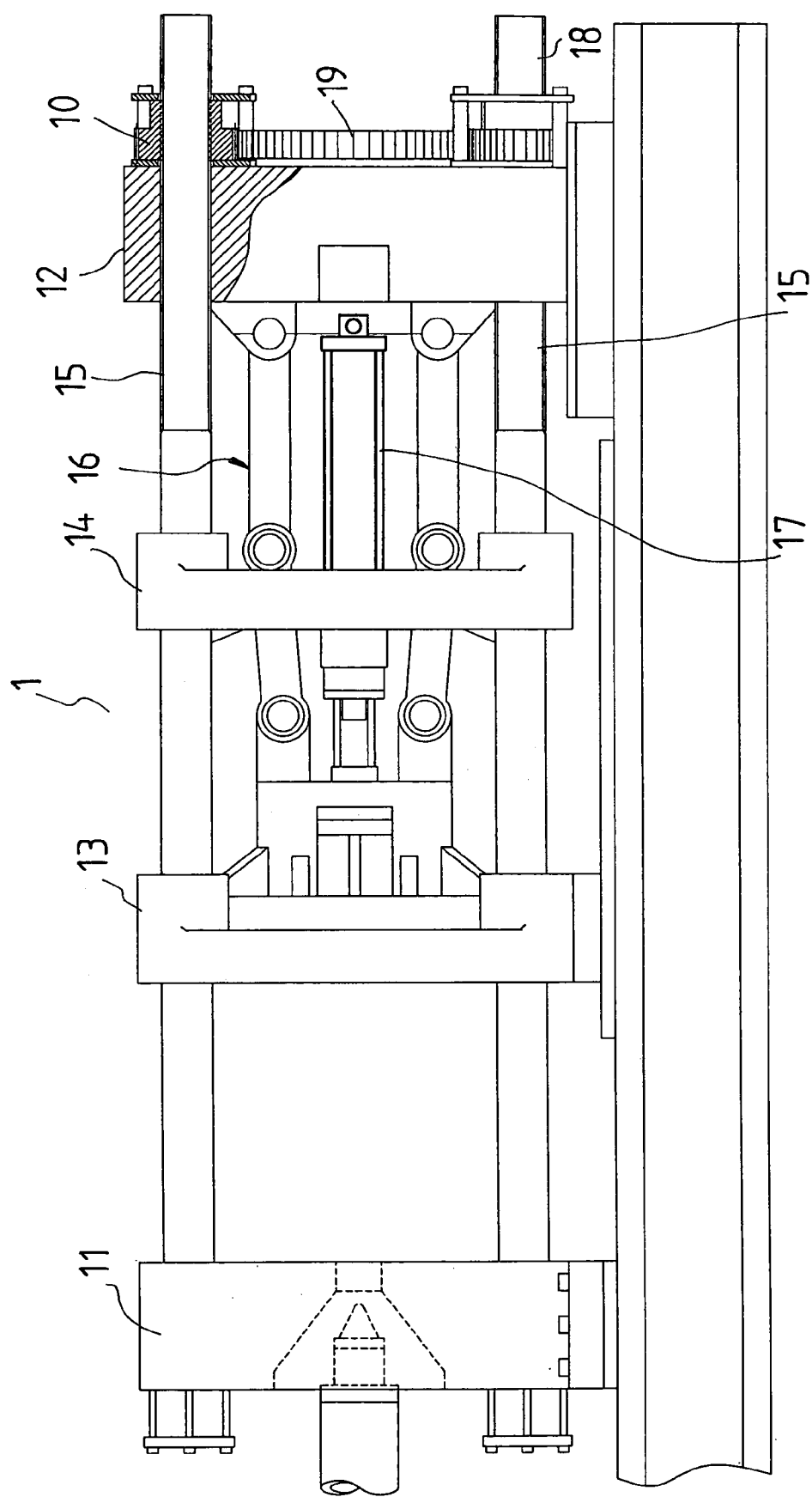
FIG. 1 is a side view of the currently existing injection molding machine.
Figure 2:
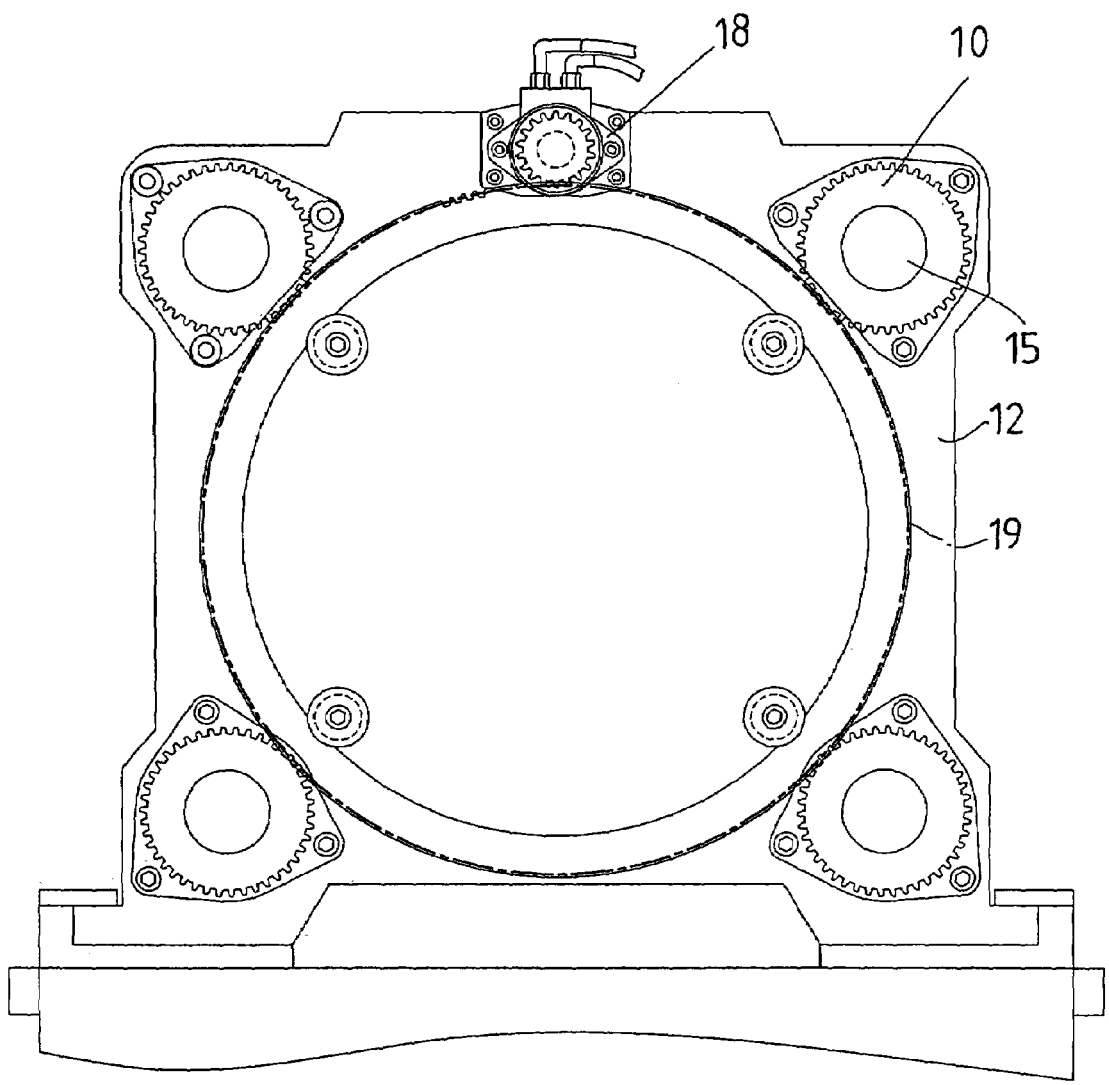
FIG. 2 is a rear view of the currently existing molding machine.
Figure 3:
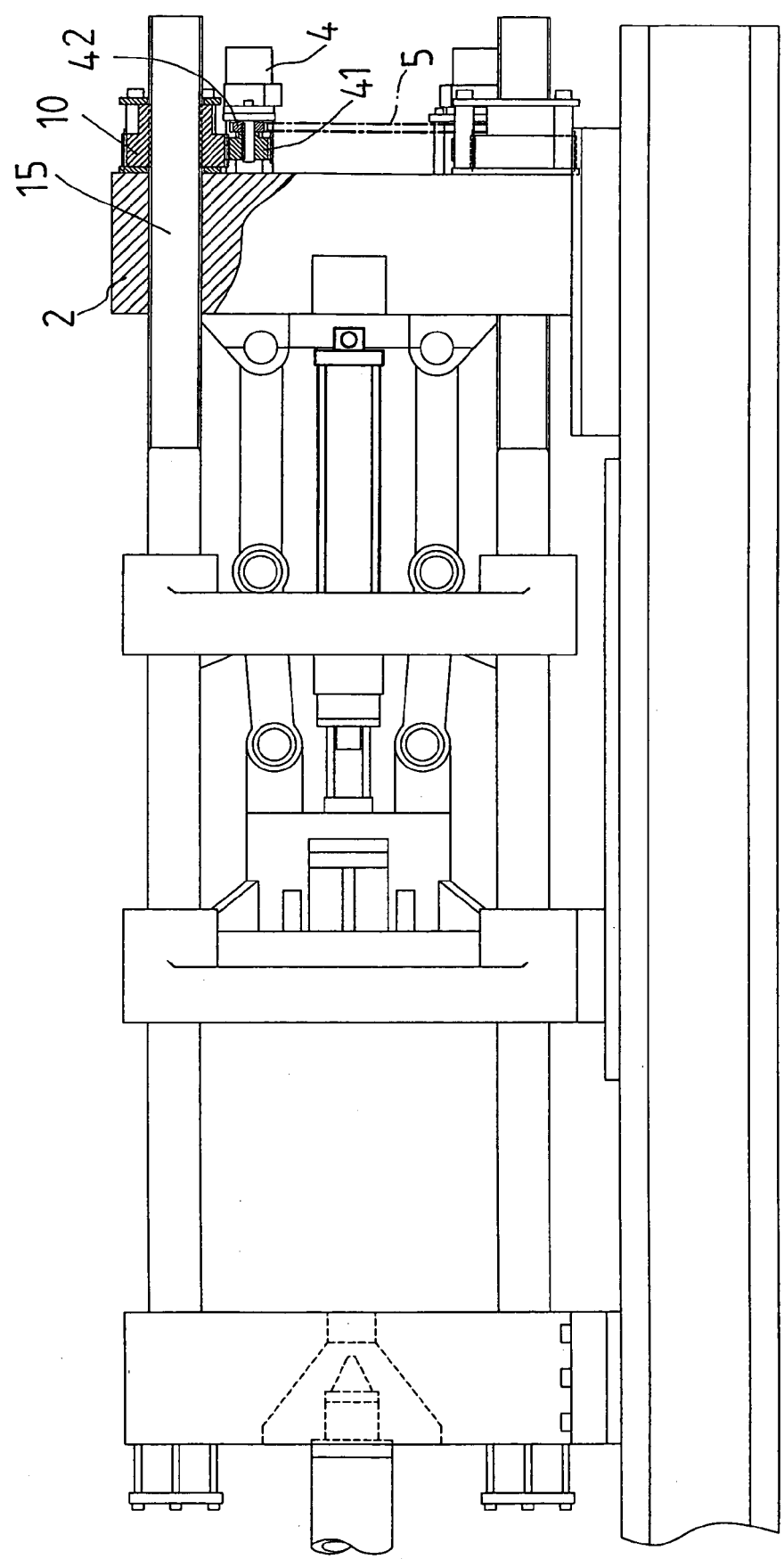
FIG. 3 is a side view of the injection molding machine according to the present invention.
Figure 4:
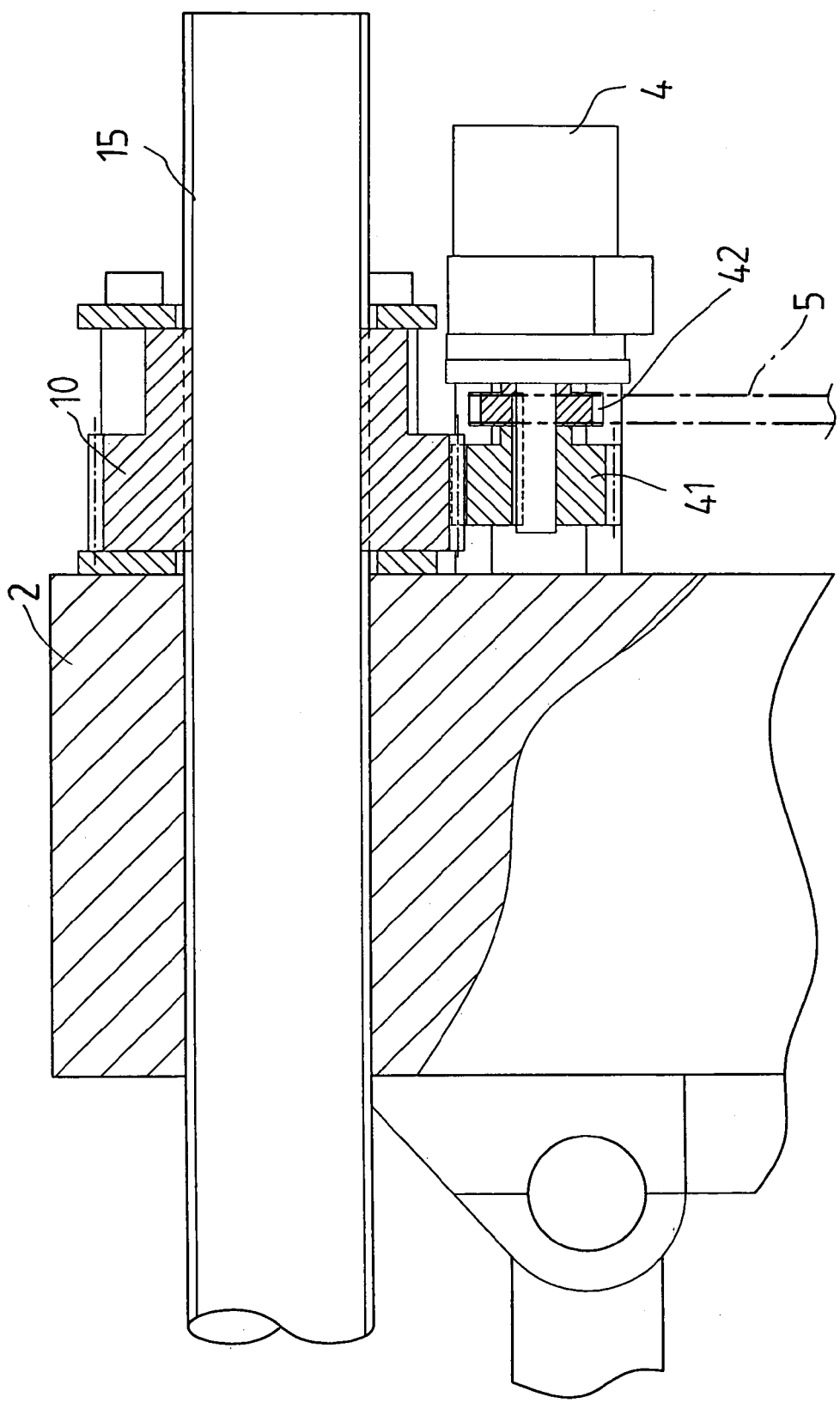
FIG. 4 is a partial side view of the machine in the invention.
Figure 5:
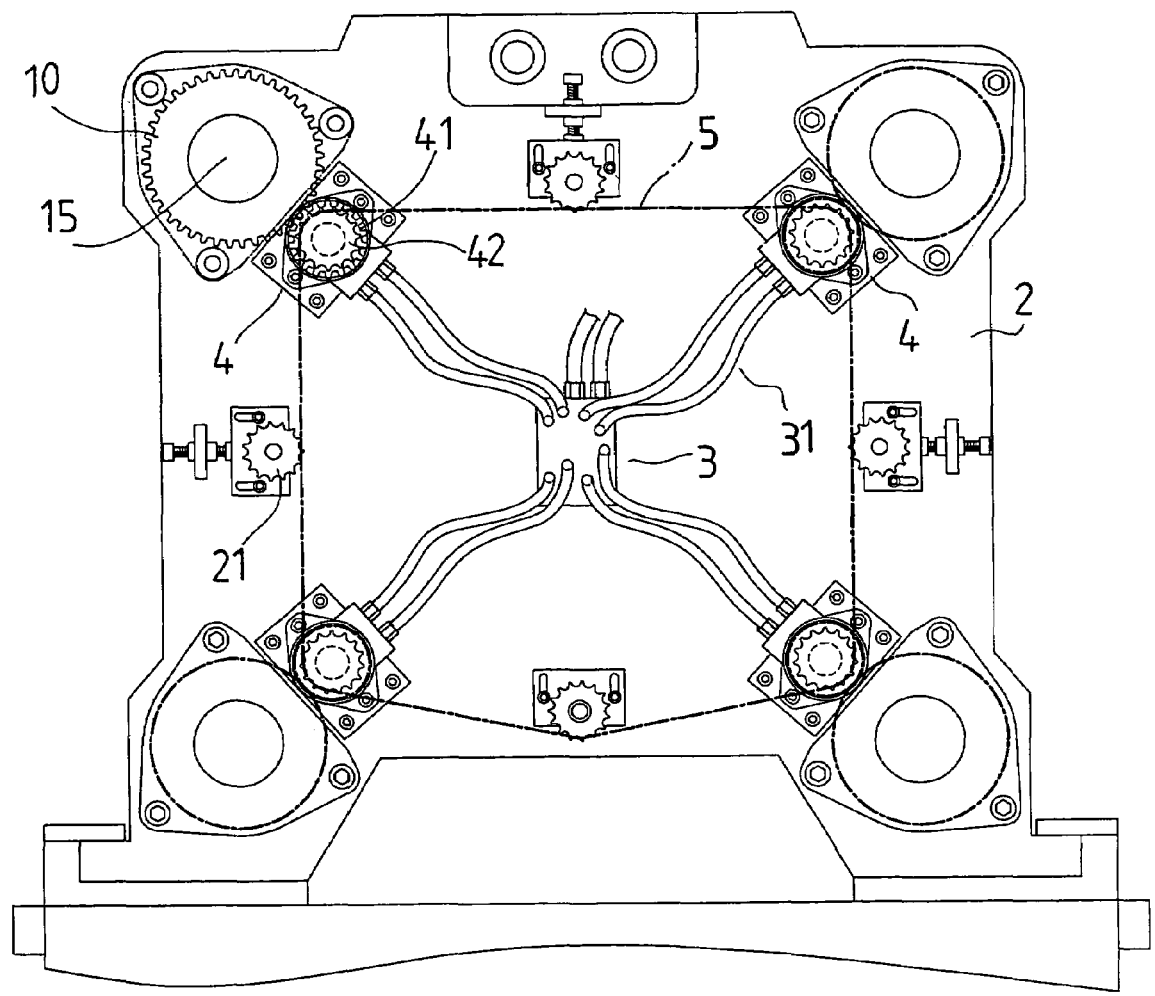
FIG. 5 is a rear view of the machine in the invention.

Referring to FIGS. 3 to 5, a preferred embodiment of an adjusting seat 2 of an injection molding machine is provided in the invention. The adjusting seat 2 is movable along four tie rods 15 of the injection molding machine, which are passed through four corner portions of the adjusting seat 2 respectively. The adjusting seat 2 has a gear 10 positioned around each of the tie rods 15, a split-flow hydraulic pump 3 secured thereon, and four hydraulic motors 4 secured thereon, which are near to respective ones of the gears 10. The split-flow hydraulic pump 3 has four oil input/output conduit sets 31, which are connected to respective ones of the hydraulic motors 4. Each of the hydraulic motors 4 has a toothed disk 41 on an output portion thereof, and a sub gear 42 joined to and turning together with each of the toothed disk 41. The toothed disks 41 are engaged with respective ones of the gears 10 around the tie rods 15. The adjusting seat 2 further has several auxiliary gears 21 thereon, and a chain 5, which is positioned over and engaged with all of the sub gears 42, and engaged with the auxiliary gears 21.

Therefore, the position of the adjusting seat 2 will be adjusted after the split-flow hydraulic pump 3 is activated; the split-flow hydraulic pump 3 will send hydraulic oil to the four hydraulic motors 4 through the oil input/output conduit sets 31 such that the toothed disks 41 connected to the output portions of the hydraulic motors 4 are rotated in a same direction (either clockwise or counterclockwise), causing the gears 10 to rotate together; thus the gears 10 move along the tie rods 15, and cause linearly displacement of the adjusting seat 2 on the tie rods 15. In addition, simultaneous rotational motion of the hydraulic motors 4 is assured because the chain 5 is positioned over and engaged with the four sub gears 42. Therefore, the adjusting seat 2 will be adjusted in its position more smoothly.

Furthermore, the purpose of the chain 5 and the sub gears 42 is to assure simultaneous rotation of the hydraulic motors 4 at the beginning of activation of the split-flow hydraulic pump 3; the chain 5 and the sub gears 42 won't be used any more after the hydraulic motors 4 begin to move in a normal way.

From the above description, it can be easily seen that the adjusting seat of the present invention has the following advantages:

1. Because of the split-flow hydraulic pump, hydraulic oil will be evenly distributed among the four hydraulic motors. Therefore, the four gears positioned around the tie rods will have equal force exerted thereon, and force output provided to displace the adjusting seat is shared among the four gears, thus significantly reducing the risk of damage of the gears and the toothed disks.

2. Because of the four sub gears and the chain positioned over and engaged with the sub gears, simultaneous rotation of the hydraulic motors is assured, and position of the adjusting seat can be adjusted more smoothly.

3. The adjusting structure includes four toothed disks, each of which is connected to a respective one of the hydraulic motors, and engages a corresponding one of the gears. Therefore, there is no need for high precision in manufacturing the present adjusting structure like in manufacturing the conventional one as described in Background. And, it takes less time and cost to manufacture and assemble the present adjusting structure.

What is claimed is:

1. An adjusting structure of an adjusting seat of an injection molding machine, comprising
 a split-flow hydraulic pump secured on an adjusting seat of an injection molding machine; the split-flow hydraulic pump being equipped with a plurality of oil input/output conduit sets;
 a plurality of hydraulic motors secured on the adjusting seat and connected to respective ones of the oil input/output conduit sets of the split-flow hydraulic pump; each of the hydraulic motors having a toothed disk on an output portion thereof;
 a plurality of gears respectively positioned around tie rods of the injection molding machine; the gears engaging the toothed disks respectively;
 a plurality of sub gears each joined to and turning together with a respective one of the toothed disks; and
 a chain positioned over and engaged with the sub gears.

2. The adjusting structure of an adjusting seat of an injection molding machine as claimed in claim 1 further having a plurality of auxiliary gears on the adjusting seat, which are engaged with the chain.

* * * * *